US012775410B2

(12) United States Patent
Jeong et al.

(10) Patent No.: US 12,775,410 B2
(45) Date of Patent: Oct. 27, 2026

(54) HIGH-SPEED COMPUTE EXPRESS LINK STORAGE TRANSFER

(71) Applicant: Samsung Electronics Co., Ltd., Suwon-si (KR)

(72) Inventors: Won Seb Jeong, Suwon-si (KR); Hyun Sub Song, Suwon-Si (KR); Hyeon Ho Song, Suwon-si (KR); Dong Hun Lee, Suwon-Si (KR); Jeong Uk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/792,970

(22) Filed: Aug. 2, 2024

(65) Prior Publication Data

US 2025/0238157 A1 Jul. 24, 2025

(51) Int. Cl.
*G06F 3/06* (2006.01)

(52) U.S. Cl.
CPC ............ *G06F 3/0647* (2013.01); *G06F 3/061* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,898,430 | B2 | 2/2018 | Davda et al. |
| 10,209,891 | B2 | 2/2019 | Noé |
| 2021/0224210 | A1 | 7/2021 | Ouyang et al. |
| 2022/0114098 | A1 | 4/2022 | Das Sharma et al. |
| 2022/0114099 | A1 | 4/2022 | Blankenship et al. |
| 2022/0121473 | A1 | 4/2022 | Gong et al. |
| 2022/0261266 | A1 | 8/2022 | Huilgol et al. |
| 2023/0027648 | A1 | 1/2023 | Chang et al. |
| 2023/0036751 | A1 | 2/2023 | Guim Bernat et al. |
| 2023/0115604 | A1 | 4/2023 | Franciosi et al. |
| 2023/0133439 | A1 | 5/2023 | Koren et al. |

(Continued)

FOREIGN PATENT DOCUMENTS

KR 20230080282 A 6/2023

OTHER PUBLICATIONS

"A CXL-Powered Database System: Opportunities and Challenges"; Yunyan Guo, Guoliang Li; May 13-16, 2024 IEEE 40th International Conference on Data Engineering (ICDE); (Year: 2024).*

(Continued)

*Primary Examiner* — Michael Alsip
(74) *Attorney, Agent, or Firm* — Fish & Richardson P.C.

(57) ABSTRACT

A storage device, a method for operating the storage device and a storage system. The storage device comprising a first memory, a second memory configured to store a bitmap indicating whether data stored in the first memory is dirty data, and a storage controller configured to control the first memory and the second memory, the storage controller configured to receive, from a CXL (Compute eXpress Link) switch, a transfer command to send the dirty data stored in the first memory to a first external device connected to the CXL switch, and in response to the transfer command, pre-fetch the data stored in the first memory into the second memory, based on the bitmap and send, to the CXL switch, a request command to request cache flush to at least one second external device connected to the CXL switch.

19 Claims, 15 Drawing Sheets

(56) References Cited

U.S. PATENT DOCUMENTS

| | | | | |
|---|---|---|---|---|
| 2023/0222067 | A1* | 7/2023 | Ji | G06F 12/127 711/136 |
| 2023/0236995 | A1 | 7/2023 | Jayaraman et al. | |
| 2023/0273731 | A1* | 8/2023 | Ki | G06F 11/1441 |
| 2023/0367712 | A1* | 11/2023 | Boles | G06F 3/0604 |
| 2024/0045804 | A1* | 2/2024 | Wang | G06F 12/0284 |

OTHER PUBLICATIONS

"ByteFS: System Support for (CXL-based) Memory-Semantic Solid-State Drives"; Shaobo Li, Yirui (Eric) Zhou, Hao Ren, Jian Huang; ASPLOS '25: Proceedings of the 30th ACM International Conference on Architectural Support for Programming Languages and Operating Systems; Mar. 30, 2025 (Year: 2025).*

"SkyByte: Architecting an Efficient Memory-Semantic CXL-based SSD with OS and Hardware Co-design"; Haoyang Zhang, Yuqi Xue, Yirui Eric Zhou, Shaobo Li, Jian Huang; 2025 IEEE International Symposium on High Performance Computer Architecture (HPCA) (Year: 2025).*

* cited by examiner

HIGH-SPEED COMPUTE EXPRESS LINK STORAGE TRANSFER

CROSS-REFERENCE TO RELATED APPLICATION

This application claims priority from Korean Patent Application No. 10-2024-0010845 filed on Jan. 24, 2024 in the Korean Intellectual Property Office, and all the benefits accruing therefrom under 35 U.S.C. 119, the contents of which in its entirety are herein incorporated by reference.

BACKGROUND

The present inventive concepts relate to storage devices, storage systems, and methods for operating the same.

With technological developments such as artificial intelligence (AI), big data, and edge computing, demands are emerging to process larger amounts of data more quickly on devices. In other words, it may be advantageous to provide high-bandwidth applications that perform complex calculations with faster data processing and more efficient memory access.

To meet this demand, data processing using a CXL (Compute eXpress Link) interface is being utilized. A host-managed device memory (HDM) is disposed/located in a CXL device. The HDM is a memory area that exists inside the CXL device and may be accessed by an HA (e.g., host CPU) or another CXL device at a physical address thereof. Dirty data as newly updated data among data stored in the HDM may need to be managed to maintain consistency thereof in data transfers between devices. Therefore, research thereon is in progress.

SUMMARY

A technical purpose that some example embodiments seek to achieve is to provide a storage device with improved reliability and speed of data transmission, a method for operating the same, and a storage system.

However, the present inventive concepts are not limited thereto. Other purposes and advantages according to the present inventive concepts that are not mentioned may be understood based on following descriptions, and may be more clearly understood based on some example embodiments according to the present inventive concepts. Further, it will be easily understood that the purposes and advantages according to the present inventive concepts may be realized using means shown in the claims and combinations thereof.

According to some example embodiments, there is provided a storage device comprising a first memory, a second memory configured to store a bitmap indicating whether data stored in the first memory is dirty data, and a storage controller configured to control the first memory and the second memory. The storage controller configured to receive, from a CXL (Compute eXpress Link) switch, a transfer command to send the dirty data stored in the first memory to a first external device connected to the CXL switch, and in response to the transfer command, pre-fetch the data stored in the first memory into the second memory, based on the bitmap, and send, to the CXL switch, a request command to request cache flush to at least one second external device connected to the CXL switch.

According to some example embodiments, there is provided a method for operating a storage device, the storage device including a first memory including a first HDM (Host-managed Device Memory) area; a second memory, the second memory including a second HDM area configured to store a bitmap, the bitmap configured to store a bit value corresponding to data stored in the first memory, and a pre-fetch data area configured to store data pre-fetched from the first memory; and a storage controller configured to control the first memory and the second memory, the method comprising: receiving, by the storage controller, a transfer command from a CXL (Compute eXpress Link) switch, the transfer command configured to instruct sending data corresponding to a first bit value of the bitmap among the data stored in the first memory to a first external device connected to the CXL switch; in response to the transfer command, pre-fetching, by the storage controller, the data corresponding to the first bit value of the bitmap from the first memory to the second memory; and in response to the transfer command, sending, by the storage controller, a request command to the CXL switch, the request command configured to request cache flush of the data corresponding to the first bit value and a second bit value of the bitmap to at least one second external device connected to the CXL switch.

According to some example embodiments, there is provided a storage system comprising a host device; a first CXL (Compute eXpress Link) device; a second CXL device; and a CXL switch configured to connect the host device and the first and second CXL devices to each other via a CXL interface, the first CXL device including: a first memory, a second memory configured to store a bitmap indicating whether data stored in the first memory is dirty data; and a storage controller configured to control the first memory and the second memory, the storage controller configured to: receive, from the CXL switch, a transfer command to send data indicated as the dirty data by the bitmap among the data stored in the first memory to the second CXL device; and in response to the transfer command, pre-fetch the data stored in the first memory to the second memory based on the bitmap, and send, to the CXL switch, a request command requesting cache flush of data related to the transfer command.

BRIEF DESCRIPTION OF DRAWINGS

The above and other aspects and features of the present inventive concepts will become more apparent by describing in detail some illustrative example embodiments thereof with reference to the attached drawings, in which.

DETAILED DESCRIPTIONS

Hereinafter, example embodiments according to the present inventive concepts will be described with reference to the attached drawings.

Figure 1:
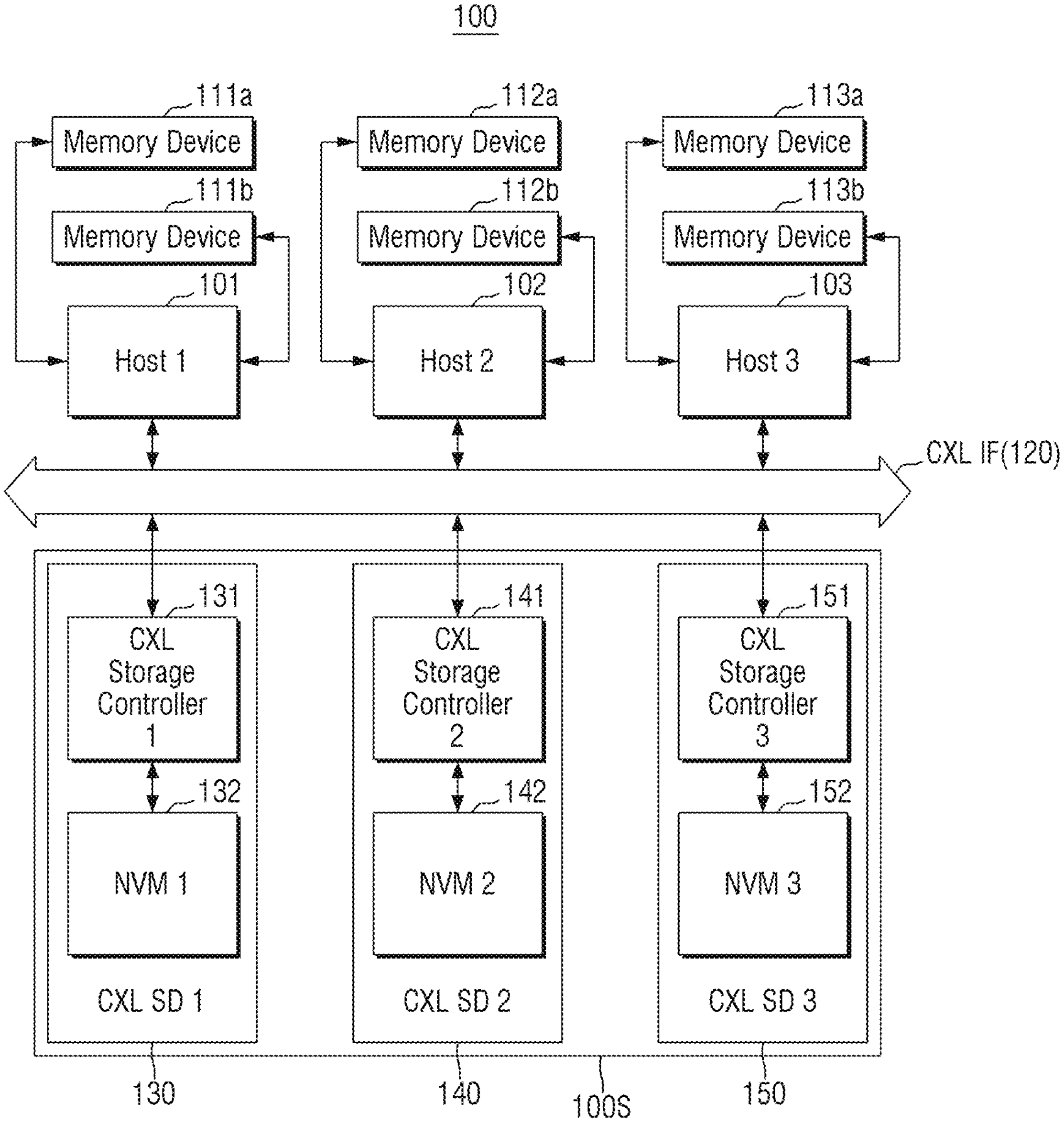
FIG. 1 is an example diagram illustrating a computing system including a storage system according to some example embodiments.

FIG. 1 is an example diagram illustrating a computing system including a storage system according to some example embodiments.

Referring to FIG. 1, a computing system 100 may include a plurality of hosts 101, 102, and 103, a plurality of memory devices 111*a*, 111*b*, 112*a*, 112*b*, 113*a*, and 113*b*, and a plurality of CXL (Compute eXpress Link) storage devices 130, 140, and 150. The plurality of CXL storage devices 130, 140, and 150 may constitute a storage system 100S.

In some example embodiments, the computing system 100 may be included in user devices such as a personal computer, a laptop computer, a server, a media player, a digital camera, etc., or automotive devices such as a navigation, a black box, an electronic device for a vehicle, etc., but example embodiments are not limited thereto.

In some example embodiments, the computing system 100 may be a mobile system such as a portable communication terminal (mobile phone), a smart phone, a tablet, personal computer (PC), a wearable device, a healthcare device, or an IoT (internet of things) device.

The hosts 101, 102, and 103 may control overall operations of the computing system 100. In some example embodiments, each of the hosts 101, 102, and 103 may be one of various processors, such as a central processing unit (CPU), a graphics processing unit (GPU), a neural processing unit (NPU), a data processing unit (DPU), etc. In some example embodiments, each of the hosts 101, 102, and 103 may include a single core processor or a multi-core processor. Moreover, in some example embodiments, each of the hosts 101, 102, and 103 may include an accelerator.

The plurality of memory devices 111*a*, 111*b*, 112*a*, 112*b*, 113*a*, and 113*b* may be used as a main memory or a system memory of the computing system 100. The memory devices 111*a* and 111*b* may be connected to the host 101. The memory devices 112*a* and 112*b* may be connected to the host 102. The memory devices 113*a* and 113*b* may be connected to the host 103.

In some example embodiments, each of the plurality of memory devices 111*a*, 111*b*, 112*a*, 112*b*, 113*a*, and 113*b* may be a dynamic random access memory (DRAM) device, and may have a form factor of a dual in-line memory module (DIMM). However, example embodiments of the present inventive concepts are not limited thereto, and each of the plurality of memory devices 111*a*, 111*b*, 112*a*, 112*b*, 113*a*, and 113*b* may include a non-volatile memory such as a flash memory, a phase change RAM (PRAM), a resistive RAM (RRAM), and a magnetic RAM (MRAM).

The memory devices 111*a* and 111*b* may communicate directly with the host 101 via a DDR interface (double data rate interface). The memory devices 112*a* and 112*b* may communicate directly with the host 102 via a DDR interface. The memory devices 113*a* and 113*b* may communicate directly with the host 103 via a DDR interface.

In some example embodiments, each of the hosts 101, 102, and 103 may include memory controllers configured to control the plurality of memory devices 111*a*, 111*b*, 112*a*, 112*b*, 113*a*, and 113*b*, respectively. However, example embodiments of the present inventive concepts are not limited thereto, and the plurality of memory devices 111*a*, 111*b*, 112*a*, 112*b*, 113*a*, and 113*b* may communicate with the hosts 101, 102, and 103 via various interfaces, respectively.

The plurality of CXL storage devices 130, 140, and 150 may include CXL storage controllers 131, 141, and 151 and non-volatile memories 132, 142, and 152, respectively. The CXL storage controllers 131, 141, and 151 may respectively store data in the non-volatile memories 132, 142, and 152 or may respectively transmit or send data stored in the non-volatile memories 132, 142, and 152 to the hosts 101, 102, and 103, under control of the hosts 101, 102, and 103, respectively. In some example embodiments, each of the non-volatile memories 132, 142, and 152 may be a NAND flash memory. However, example embodiments of the present inventive concepts are not limited thereto.

In some example embodiments, the hosts 101, 102, and 103 and the CXL storage devices 130, 140, and 150 may be configured to share the same interface with each other. For example, the hosts 101, 102, and 103 and the CXL storage devices 130, 140, and 150 may communicate with each other via a CXL interface (a compute express link interface) 120. The CXL interface 120 may mean a low-latency and high-bandwidth link that is configured to support coherency, memory access, and dynamic protocol muxing of an input/output protocol (IO protocol) to enable various connections between accelerators, memory devices, or various electronic devices.

Figure 2:
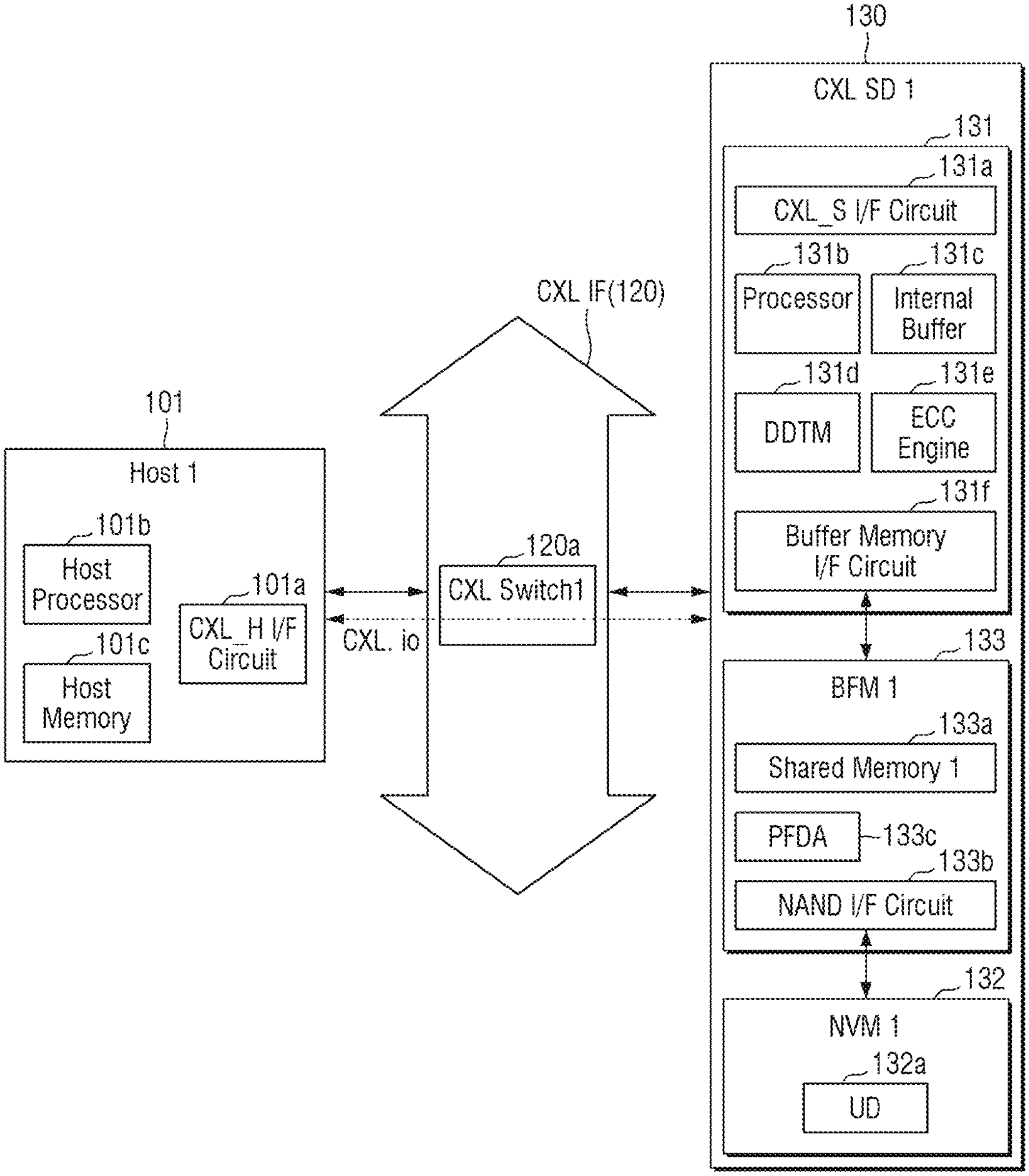
FIG. 2 is an example diagram illustrating components of a host and a CXL storage device in FIG. 1 according to some example embodiments.
Figure 3:
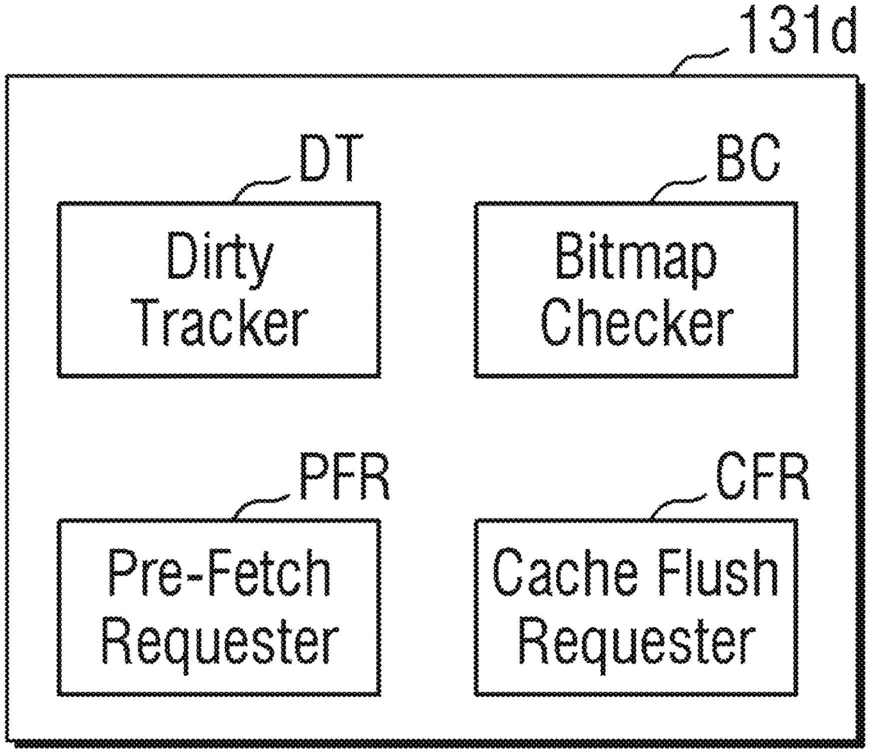
FIG. 3 is an example diagram showing a configuration of a dirty data transfer manager in FIG. 2 according to some example embodiments.
Figure 4:
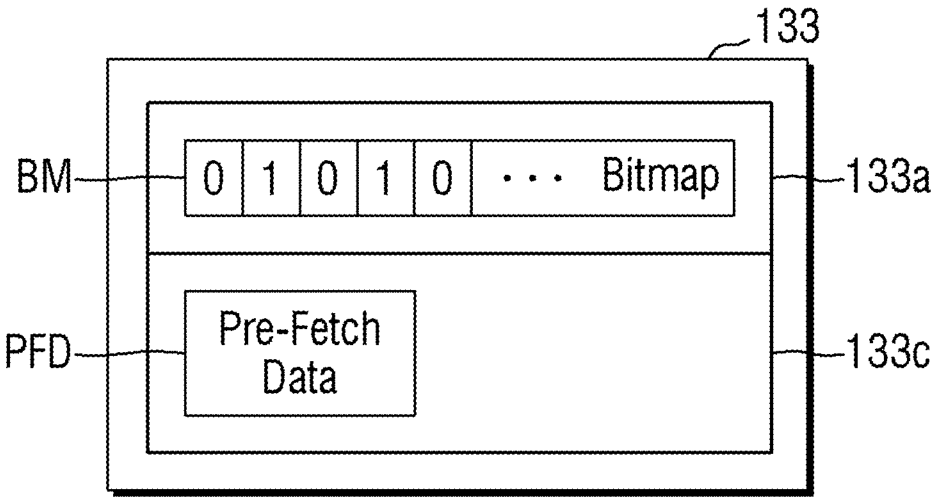
FIG. 4 is an example diagram showing a configuration of a buffer memory in FIG. 2 according to some example embodiments.
Figure 5:
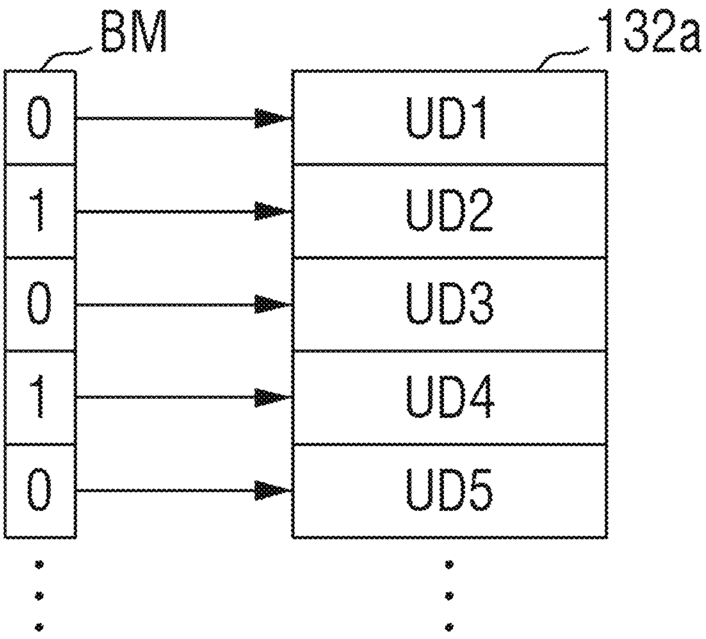
FIG. 5 is a diagram illustrating a relationship between a bitmap in FIG. 4 and user data stored in a non-volatile memory according to some example embodiments.

FIG. 2 is an example diagram illustrating components of each of the host and the CXL storage devices in FIG. 1 according to some example embodiments. FIG. 3 is an example diagram showing a configuration of a dirty data transfer manager in FIG. 2 according to some example embodiments. FIG. 4 is an example diagram showing a configuration of a buffer memory in FIG. 2 according to some example embodiments. FIG. 5 is a diagram illustrating a relationship between a bitmap in FIG. 4 and user data stored in a non-volatile memory according to some example embodiments.

FIG. 2 shows only the host 101 and the CXL storage device 130 by way of example. Following descriptions about the host 101 may be equally applied to each of the hosts 102 and 103 in FIG. 1. Following descriptions about the CXL storage device 130 may be equally applied to each of the CXL storage devices 140 and 150 in FIG. 1.

The host 101 and the CXL storage device 130 may communicate with each other via the CXL interface 120. However, example embodiments of the present inventive concepts are not limited thereto, and the host 101 and the CXL storage device 130 may communicate with each other based on various computing interfaces such as a GEN-Z protocol, a NVLink protocol, a CCIX (Cache Coherent Interconnect for Accelerators) protocol, or an Open CAPI (Coherent Accelerator Processor Interface) protocol.

Referring to FIG. 2, the CXL interface 120 may include low-level protocols CXL.io, CXL.cache, CXL.mem, etc. The CXL.io protocol may be a PCIe (Peripheral Component Interconnect Express) transaction layer and may be used to search a device, manage an interrupt, provide or allow an access by a register, process initialization, and deal with a signal error in the computing system 100. The CXL.cache protocol may be used when an accelerator (e.g., GPU or Field Programmable Gate Array (FPGA)) accesses the host memory 101*c*. The CXL.mem protocol may be used when the host 101 accesses a dedicated memory of the accelerator or the buffer memory 133 of the CXL storage device 130.

In some example embodiments, the host 101 and the CXL storage device 130 may communicate with each other using the input/output protocol CXL.io. The CXL.io may have an inconsistent input/output protocol based on PCIe. The host 101 and the CXL storage device 130 may exchange various information including user data (UD) 132*a* with each other using the CXL.io.

The host 101 may include a host processor 101*b*, a host memory 101*c*, and a CXL host interface circuit 101*a*. The host processor 101*b* may control all operations of the host 101. In some example embodiments, the host processor 101*b* may be one of a number of modules provided in an application processor (AP). This application processor may be embodied as a SoC (System on Chip).

The host memory 101*c* may be a working memory and may store therein instructions, programs, and/or data necessary for an operation of the host processor 101*b*. In some example embodiments, the host memory 101*c* may function as a buffer memory for temporarily storing therein data to be transmitted or sent to the CXL storage device 130, or data transmitted or sent from the CXL storage device 130. When the host processor 101*b* is embodied as the AP, the host memory 101*c* may be an embedded memory provided within the AP, or may be a non-volatile memory or a memory module disposed outside the AP.

In some example embodiments, the host processor 101*b* and the host memory 101*c* may be embodied as separate semiconductor chips. Alternatively, in some example embodiments, the host processor 101*b* and the host memory 101*c* may be integrated into a single semiconductor chip.

The CXL host interface circuit 101*a* may communicate with the CXL storage device 130 via the CXL interface 120. For example, the CXL host interface circuit 101*a* may communicate with the CXL storage device 130 via a CXL switch 120*a* included in the CXL interface 120.

For example, this CXL switch 120*a* may perform management of data storage, data update, and data transmission between devices (e.g., host devices, memory devices, accelerators, etc.) connected to the CXL interface 120. In some example embodiments, the CXL switch 120*a* may have a hardware configuration to achieve this functionality. However, example embodiments of the present inventive concepts are not limited thereto.

The CXL storage device 130 may include a CXL storage controller 131, a buffer memory 133, and a non-volatile memory 132.

The CXL storage controller 131 may include a CXL storage interface circuit 131*a*, a processor 131*b*, an internal buffer 131*c*, a dirty data transfer manager (DDTM) 131*d*, an error correction code (ECC) engine 13*l*, and a buffer memory interface circuit 131*f*. According to some example embodiments, the CXL storage controller 131 and each of the CXL storage interface circuit 131*a*, processor 131*b*, internal buffer 131*c*, dirty data transfer manager (DDTM) 131*d*, error correction code engine 13*l*, and buffer memory interface circuit 131*f* may include or be implemented in one or more processing circuitries such as hardware including logic circuits; a hardware/software combination such as the processor 131*b* executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System on Chip (SoC), a programmable logic unit, a microprocessor, application-specific integrated circuit (ASIC), etc.

The CXL storage interface circuit 131*a* may be connected to the CXL switch 120*a*. The CXL storage interface circuit 131*a* may communicate with the host 101 or other CXL storage devices (e.g., CXL storage devices 140 and 150 illustrated in FIG. 1) via the CXL switch 120*a*.

The processor 131*b* may be configured to control the overall operations of the CXL storage controller 131. Firmware that controls the operation of the CXL storage controller 131 may be executed by the processor 131*b*.

The internal buffer 131*c* may be used as a working memory or an internal buffer memory of the CXL storage controller 131. In some example embodiments, the internal buffer 131*c* may receive and store therein data stored in a pre-fetch data area 133*c* of the buffer memory 133. In some example embodiments, the internal buffer 131*c* may store therein data flushed from a cache memory of devices (e.g., host devices, accelerators, etc.) connected to the CXL interface 120. In some example embodiments, the internal buffer 131*c* may be used to update data provided from the pre-fetch data area 133*c* of the buffer memory 133, based on the data flushed from the cache memory of the devices (e.g., host devices, accelerators, etc.) connected to the CXL interface 120.

In some example embodiments, the CXL storage controller 131 may transfer the data flushed from the cache memory of the devices (e.g., host devices, accelerators, etc.) connected to the CXL interface 120 or the data updated based on the flushed data to the other CXL storage devices (e.g., CXL storage devices 140 and 150 illustrated in FIG. 1). A detailed description related thereto according to some example embodiments will be made later.

In some example embodiments, the internal buffer 131*c* may be embodied as, for example, SRAM (Static Random Access Memory). However, example embodiments of the present inventive concepts are not limited thereto.

In some example embodiments, the internal buffer 131*c* may not be disposed/located within the storage controller 131, but may be disposed/located outside the storage controller 131.

The dirty data transfer manager (DDTM) 131*d* may manage the dirty data stored in the non-volatile memory 132 and may manage an operation of transmitting or sending the dirty data to the other CXL storage devices (e.g., CXL storage devices 140 and 150 illustrated in FIG. 1).

According to some example embodiments, the dirty data refers to newly updated data among the user data 132*a* stored in the non-volatile memory 132 according to a write command from the host devices (e.g., host devices 101, 102, and 103 illustrated in FIG. 1) or other devices connected to the CXL interface 120.

Referring to FIGS. 2 and 3, in some example embodiments, the dirty data transfer manager (DDTM) 131*d* may include a dirty tracker DT, a bitmap checker BC, a pre-fetch requester PFR, and a cache flush requester CFR.

In some example embodiments, at least some of the dirty tracker DT, the bitmap checker BC, the pre-fetch requester PFR, and the cache flush requester CFR may be implemented in software, while the remaining ones thereof may be implemented in hardware. However, example embodiments are not limited thereto, and all of the dirty tracker DT, the bitmap checker BC, the pre-fetch requester PFR, and the cache flush requester CFR may be implemented in software or in hardware. For example, the dirty data transfer manager (DDTM) 131*d* including each of the dirty tracker DT, bitmap checker BC, pre-fetch requester PFR, and cache flush requested CFR may include or be implemented in one or more processing circuitries such as hardware including logic circuits; a hardware/software combination such as a processor executing software or a combination thereof.

The dirty tracker DT may manage the bitmap (e.g., BM illustrated in FIG. 4) corresponding to a physical address indicated by the write command received from the host devices (e.g., host devices 101, 102, and 103 illustrated in FIG. 1) or other devices connected to the CXL interface 120. For example, the dirty tracker DT may manage the bitmap (e.g., BM illustrated in FIG. 4) by setting a bit value of 1 indicating the dirty data to a position of the bitmap (e.g., BM illustrated in FIG. 4) corresponding to the physical address indicated by the write command received from the host device (e.g., host devices 101, 102, and 103 illustrated in FIG. 1) or other devices connected to the CXL interface 120.

The bitmap checker BC may check the bitmap (e.g., BM illustrated in FIG. 4). For example, when the bit value of a position of the bitmap (e.g., BM illustrated in FIG. 4) is 1, the bitmap checker BC may recognize or determine that the user data 132*a* of the non-volatile memory 132 corresponding thereto is the dirty data. For example, when the bit value of a position of the bitmap (e.g., BM illustrated in FIG. 4) is 0, the bitmap checker BC may recognize or determine that the user data 132*a* of the non-volatile memory 132 corresponding thereto is not the dirty data.

In some example embodiments, the bitmap checker BC may generate a first thread and a second thread to perform a search for the bitmap (e.g., BM illustrated in FIG. 4).

The first thread may invoke the pre-fetch requester PFR such that the user data 132*a* corresponding to a bit value of 1 in the bitmap (e.g., BM illustrated in FIG. 4) indicating that the user data 132*a* is the dirty data may be pre-fetched into the pre-fetch data area 133*c* of the buffer memory 133.

The second thread may invoke the cache flush requester CFR to search for the latest data of the data corresponding to the bitmap (e.g., BM illustrated in FIG. 4) regardless of whether the bit value of the bitmap (e.g., BM illustrated in FIG. 4) is 1 or 0.

The pre-fetch requester PFR may pre-fetch the user data 132*a* of the non-volatile memory 132 corresponding to the bit value of the bitmap (e.g., BM illustrated in FIG. 4) having 1 indicating that the user data is the dirty data to the buffer memory 133.

The cache flush requester CFR may transmit or send to the CXL switch 120*a*, a request command to request cache flush of the data corresponding to the bitmap (e.g., BM illustrated in FIG. 4) to the other devices connected to the CXL switch 120*a*. Then, in some example embodiments, in response to reception of the request command, the CXL switch 120*a* may request the cache flush to the other devices connected to the CXL switch 120*a*.

In some example embodiments, a pre-fetch operation of the pre-fetch requester PFR may be performed in an overlapping manner with a request command transmission or sending operation of the cache flush requester CFR. For example, in some example embodiments, the pre-fetch operation of the pre-fetch requester PFR may be performed as a background operation while the request command transmission or sending operation of the cache flush requester CFR is performed.

The ECC engine 13*l* may detect and correct an error on the data stored in the non-volatile memory 132. For example, the ECC engine 13*l* may generate a parity bit for the user data 132*a* to be stored in the non-volatile memory 132, and the generated parity bits along with the user data 132*a* may be stored in the non-volatile memory 132. For example, when the user data 132*a* is read from the non-volatile memory 132, the ECC engine 13*l* may detect and correct the error in the user data 132*a* using the parity bits read from the non-volatile memory 132 together with the read user data 132*a*.

The buffer memory interface circuit 131*f* may control the buffer memory 133 so that data is stored in the buffer memory 133 or data is read from the buffer memory 133. In some example embodiments, the buffer memory interface circuit 131*f* may be implemented to comply with a standard such as a DDR (Double Data Rate) interface, a low power double data rate (LPDDR) interface, etc.

The buffer memory 133 may store therein data or output the stored data therefrom under control of the CXL storage controller 131. Moreover, in some example embodiments, the buffer memory 133 may store therein various kinds of information necessary for the operation of the CXL storage device 130.

In some example embodiments, the buffer memory 133 may be a high-speed memory such as DRAM. However, example embodiments of the present inventive concepts are not limited thereto.

Referring to FIG. 2 and FIG. 4, in some example embodiments, the buffer memory 133 may include a shared memory area 133*a* as a host-managed device memory (HDM), and the pre-fetch data area 133*c* in which data PFD pre-fetched from the non-volatile memory 132 is stored and is other (e.g., different) than HDM. For example, the HDM is a memory area that is present inside the CXL device 130 and may be accessed, at a physical address thereof, by HA (e.g., Host CPU) or other CXL devices (e.g., other CXL storage devices, accelerators, etc.).

The shared memory area 133*a* may store therein data collected by the CXL storage controller 131 monitoring a status thereof (e.g., a status of the CXL storage device 130), for example, a hardware status and a software status thereof. The hardware status may include a remaining capacity, the number of bad blocks, a temperature, a lifespan, etc., but example embodiments are not limited thereto. The software status may include a busy level, an amount of a command (or request) received from the host 101, a command pattern (or request pattern) frequently requested from the host 101, and a data pattern requested from the host.

In some example embodiments, the bitmap BM indicating whether the user data 132*a* stored in the non-volatile memory 132 is the dirty data may be stored in the shared memory area 133*a*.

Referring to FIG. 5, in some example embodiments, each bit value (0 or 1) of the bitmap BM may indicate whether the user data 132*a* stored in the non-volatile memory 133 is the dirty data.

In some example embodiments, one bit value of the bitmap BM may be set per each page data of the non-volatile memory 133. For example, in the bitmap BM, one bit value may be set on a 4 KB data basis of the non-volatile memory 133. However, example embodiments of the present inventive concepts are not limited thereto. In some example embodiments, in the bitmap BM, one bit value may be set on a 64 bytes or 512 bytes or 2 MB data basis of the non-volatile memory 133.

Referring to FIG. 5, in some example embodiments, the bit value 0 of the bitmap BM may indicate that corresponding user data UD1, UD3, and UD5 or data of a corresponding page is not the dirty data. The bit value 1 of the bitmap BM may indicate that corresponding user data UD2 and UD4 or data of a corresponding page is the dirty data.

The bit value of the bitmap BM may be managed by the dirty tracker DT of the storage controller 131 as described previously according to some example embodiments. However, example embodiments of the present inventive concepts are not limited thereto.

Referring back to FIG. 1, in the computing system 100, other devices connected to the CXL storage device 130 via the CXL interface 120 may access the shared memory area 133*a* of the CXL storage device 130. For example, the CXL storage controller (e.g., CXL storage controller 141 illustrated in FIG. 1) may access the shared memory area 133*a* of the CXL storage device 130 via the CXL switch 120*a*. The host (e.g., host 101 illustrated in FIG. 1) may access the shared memory 133*a* of the CXL storage device 130 via the CXL switch 120*a*.

Referring to FIG. 2, the shared memory area 133*a* is shown as being disposed/located within the buffer memory 133. However, example embodiments of the present inventive concepts are not limited thereto. For example, in some example embodiments, the shared memory area 133*a* may be disposed/located outside the buffer memory 133 so as to be accessible by the CXL storage controller 131. In other words, the data stored in the shared memory area 133*a* may be not data temporarily stored in the buffer memory 133, but, in some example embodiments, may be data stored non-temporarily (e.g., permanently) in the CXL storage device 130 (for example, in the CXL storage controller 131) for the operation of the CXL storage device 130.

The data pre-fetched from the non-volatile memory 132 by the pre-fetch requester PFR of the storage controller 131 may be stored in the pre-fetch data area (PFDA) 133*c*. For example, the user data 132*a* corresponding to the bit value 1 of the bitmap BM among the user data 132*a* of the non-volatile memory 132 may be pre-fetched from the non-volatile memory 132 by the pre-fetch requester PFR and then may be stored in the pre-fetch data area 133*c*.

According to some example embodiments, a NAND interface circuit 133*b* may control the non-volatile memory 132 so that data is stored in the non-volatile memory 132 or data is read from the non-volatile memory 132. In some example embodiments, the NAND interface circuit 133*b* may be implemented to comply with a standard such as a toggle interface or ONFI (Open NAND Flash Interface Working Group).

For example, when the non-volatile memory 132 includes a plurality of NAND flash devices and the NAND interface circuit 133*b* is implemented based on the toggle interface, the NAND interface circuit 133*b* may communicate with the plurality of NAND flash devices via a plurality of channels, and the plurality of NAND flash devices may be connected to the plurality of channels via a multi-channel-multiway structure.

In some example embodiments, the NAND interface circuit 133*b* may transmit or send a chip enable signal/CE, a command latch enable signal CLE, an address latch enable signal ALE, a read enable signal/RE, and a write enable signal/WE to each of the plurality of NAND flash devices via each of the plurality of channels. Moreover, in some example embodiments, the NAND interface circuit 133*b* and each of the plurality of NAND flash devices may exchange a data signal DQ and a data strobe signal DQS with each other via each of the plurality of channels.

In FIG. 2, the NAND interface circuit 133*b* is shown as included in the buffer memory 133. However, example embodiments of the present inventive concepts are not limited thereto. For example, when the buffer memory 133 is included in the storage controller 131, the NAND interface circuit 133*b* may be disposed/located inside the storage controller 131 and outside the buffer memory 133.

The non-volatile memory 132 may store therein or output the user data 132*a* therefrom under the control of the CXL storage controller 131. In some example embodiments, the non-volatile memory 132 may include a host-managed device memory (HDM) storing the user data 132*a*. In some example embodiments, the non-volatile memory 132 may include a NAND flash memory. However, example embodiments of the present inventive concepts are not limited thereto. In some example embodiments, the non-volatile memory 132 may include a non-volatile memory other than the NAND flash memory, such as a phase change RAM (PRAM), resistive RAM (RRAM), magnetic RAM (MRAM), etc.

Figure 6:
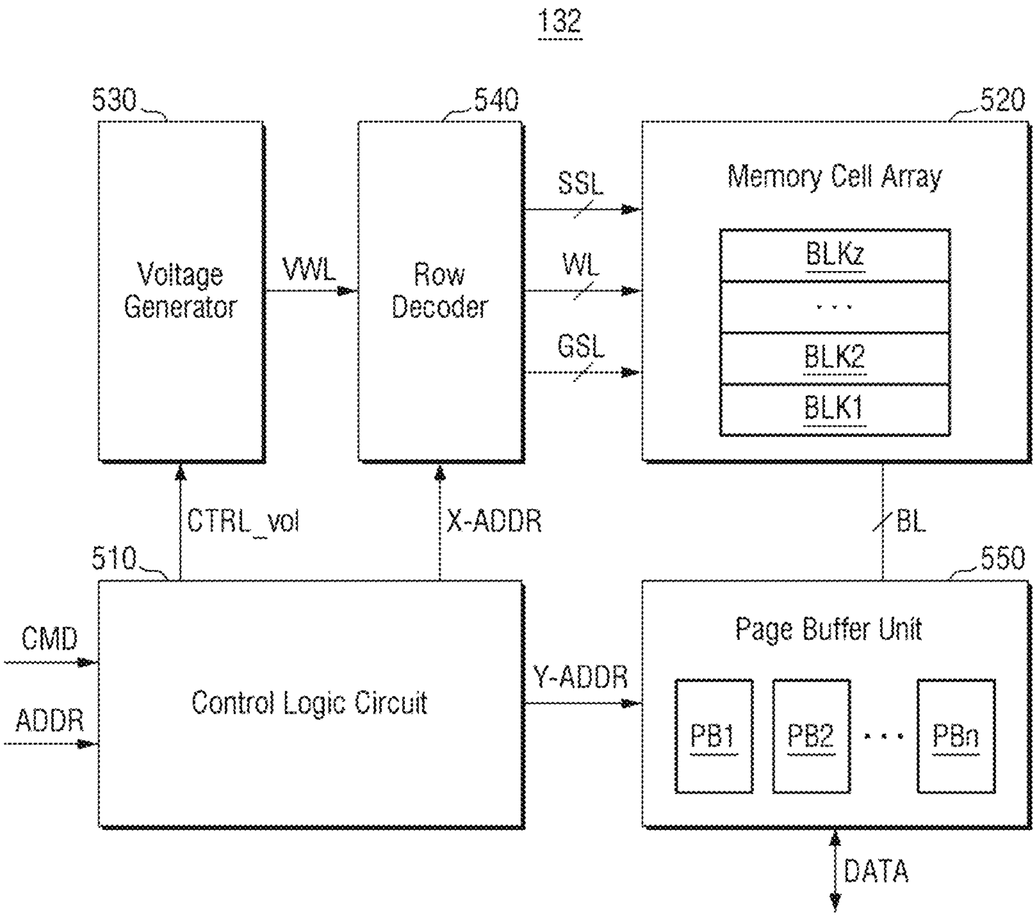
FIG. 6 is an example block diagram showing a non-volatile memory in FIG. 2 according to some example embodiments.

FIG. 6 is an example block diagram showing the non-volatile memory in FIG. 2 according to some example embodiments.

Referring to FIG. 6, the non-volatile memory 132 may include a control logic circuit 510, a memory cell array 520, a page buffer unit 550, a voltage generator 530, and a row decoder 540. Although not shown in FIG. 6, in some example embodiments, the non-volatile memory 132 may further include an interface circuit. Furthermore, in some example embodiments, the non-volatile memory 132 may include a column logic, a pre-decoder, a temperature sensor, a command decoder, an address decoder, etc., but example embodiments are not limited thereto.

The control logic circuit 510 may control all of the various operations within the non-volatile memory 132. The control logic circuit 510 may output various control signals in response to a command CMD and/or address ADDR from the memory interface circuit 131*f*. For example, the control logic circuit 510 may output a voltage control signal CTRL_vol, a row address X-ADDR, and a column address Y-ADDR.

The memory cell array 520 may include a plurality of memory blocks BLK1 to BLKz, where z is a positive integer. Each of the plurality of memory blocks BLK1 to BLKz may include a plurality of memory cells. The memory cell array 520 may be connected to the page buffer unit 550 via bit-lines BL, and may be connected to the row decoder 540 via word-lines WL, string select lines SSL, and ground select lines GSL.

In some example embodiments, the memory cell array 520 may include a three-dimensional memory cell array. The three-dimensional memory cell array may include a plurality of NAND strings. Each NAND string may include memory cells respectively connected to the word-lines WLs disposed/located vertically on a substrate. Further, it will be understood that when an element is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element. In some example embodiments, the memory cell array 520 may include a two-dimensional memory cell array. The two-dimensional memory cell array may include a plurality of NAND strings arranged along row and column directions.

The page buffer unit 550 may include a plurality of page buffers PB1 to PBn, where n is an integer greater than or equal to 3. The plurality of page buffers PB1 to PBn may be connected to the memory cells via the plurality of bit-lines BL, respectively. The page buffer unit 550 may select at least one bit-line from among the bit-lines BL in response to the column address Y-ADDR. The page buffer unit 550 may act and/or operate as a write-in driver or a sensing amplifier depending on an operation mode. For example, in a programming operation, the page buffer unit 550 may apply a bit-line voltage corresponding to data to be programmed to the selected bit-line. In a reading operation, the page buffer unit 550 may detect or determine current or voltage of the selected bit-line BL and thus detect or determine the data stored in the memory cell based on the detected or determined current or voltage.

The voltage generator 530 may generate various kinds of voltages for performing programing, reading, and erasing operations, based on the voltage control signal CTRL_vol. For example, the voltage generator 530 may generate a program voltage, a read voltage, a program verification voltage, an erase voltage, etc., as the word-line voltage VWL.

The row decoder 540 may select one of the plurality of word-lines WL in response to the row address X-ADDR and may select one of the plurality of string select lines SSL. For example, in a programming operation, the row decoder 540 may apply the program voltage and the program verification voltage to the selected word-line, and may apply the read voltage to the selected word-line in a reading operation.

Figure 7:
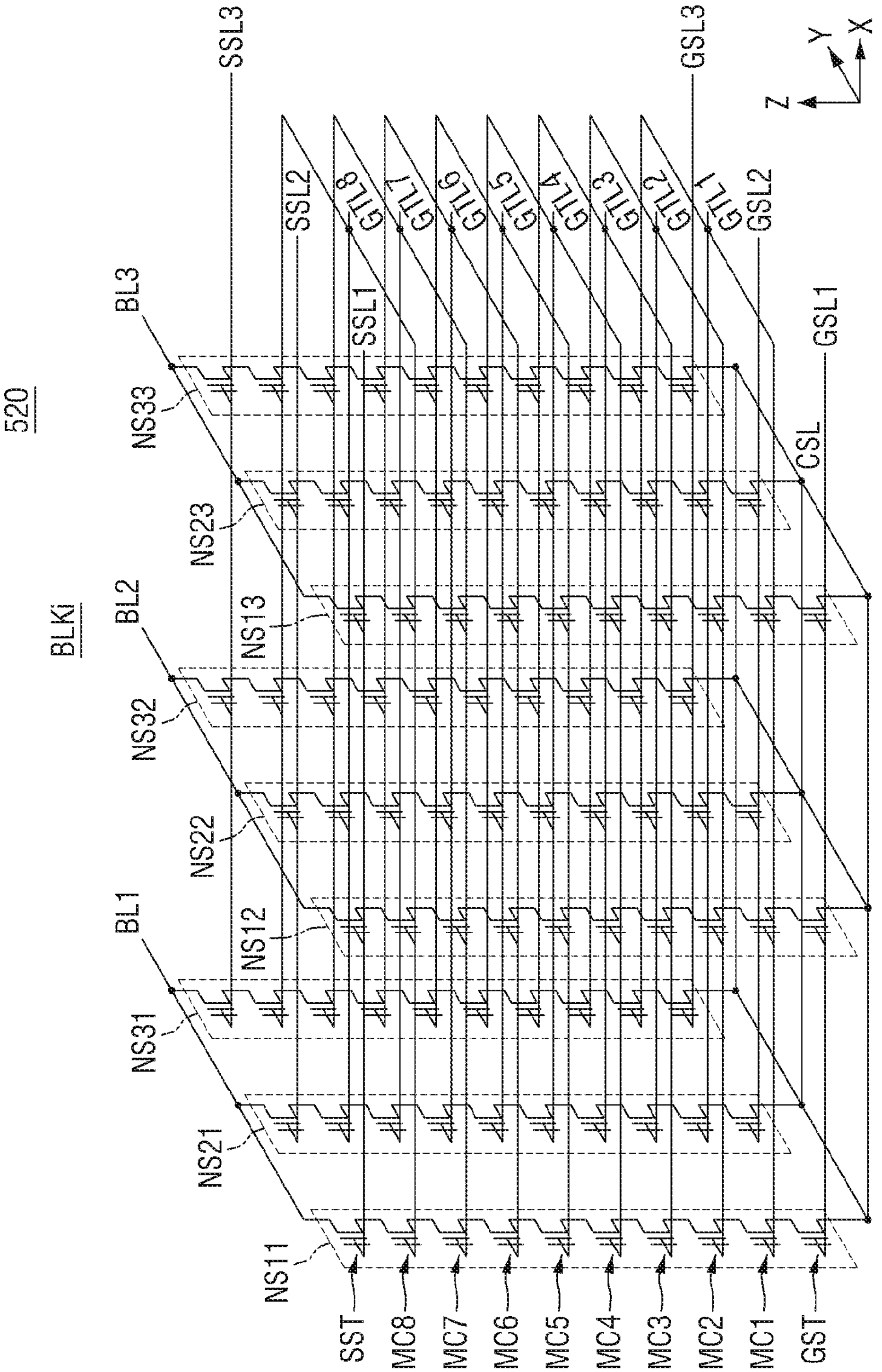
FIG. 7 is a diagram illustrating a 3D V-NAND structure that may be applied to a non-volatile memory according to some example embodiments.

FIG. 7 is a diagram illustrating a 3D V-NAND structure that may be applied to a non-volatile memory according to some example embodiments. For example, when a storage module of the storage device is implemented as a 3D V-NAND type flash memory, each of the plurality of memory blocks constituting the storage module may be represented by an equivalent circuit as shown in FIG. 7.

A memory block BLKi shown in FIG. 7 represents a three-dimensional memory block formed in a three-dimensional structure on the substrate. For example, a plurality of memory NAND strings included in the memory block BLKi may extend in a direction perpendicular to the substrate.

Referring to FIG. 7, the memory block BLKi may include a plurality of memory NAND strings NS11 to NS33 disposed/located between and connected to bit-lines BL1, BL2, BL3 and the common source line CSL. Each of the plurality of memory NAND strings NS11 to NS33 may include a string select transistor SST, a plurality of memory cells MC1, MC2, . . . , MC8 and a ground select transistor GST. In FIG. 7, an example in which each of the plurality of memory NAND strings NS11 to NS33 includes eight memory cells MC1, MC2, . . . , MC8 is illustrated. However, the example embodiments of the present inventive concepts are not necessarily limited thereto.

The string select transistor SST may be connected to a corresponding one of string select lines SSL1, SSL2 and SSL3. The plurality of memory cells MC1, MC2, . . . , MC8 may be connected to the corresponding gate lines GTL1, GTL2, . . . , GTL8, respectively. Gate lines GTL1, GTL2, . . . , GTL8 may act as word-lines. Some of the gate lines GTL1, GTL2, . . . , GTL8 may act as dummy word-lines. The ground select transistor GST may be connected to a corresponding one of ground select lines GSL1, GSL2, and GSL3. The string select transistor SST may be connected to a corresponding one of the bit-lines BL1, BL2, and BL3, while the ground select transistor GST may be connected to the common source line CSL.

The word-lines (e.g., WL1) at the same vertical level may be integrated into one word line. The ground select lines GSL1, GSL2, and GSL3 at the same vertical level may be separated from each other. The string select lines SSL1, SSL2, and SSL3 at the same vertical level may be separated from each other. FIG. 7 shows an example in which the memory block BLK is connected to the eight gate lines GTL1, GTL2, . . . , GTL8 and the three bit-lines BL1, BL2, and BL3. However, example embodiments of the present inventive concepts are not necessarily limited thereto. Further, it will be understood that elements and/or properties thereof may be recited herein as being "the same" or "equal" as to other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof.

Hereinafter, with reference to FIGS. 8 to 14, an operation of the storage system according to some example embodiments is described.

Figure 8:
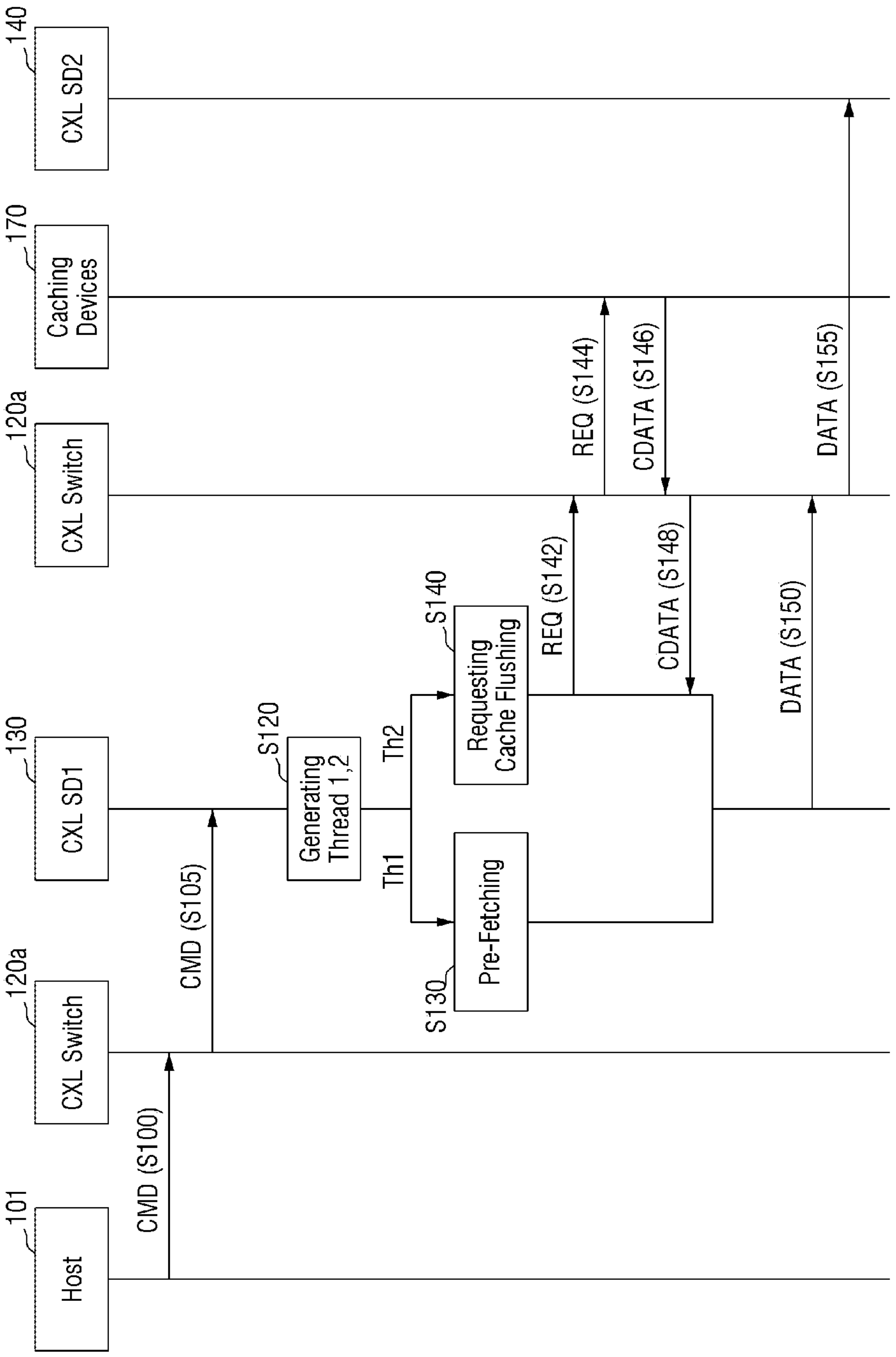
FIG. 8 is a flowchart illustrating an operation of a storage system according to some example embodiments.

FIG. 8 is a flowchart illustrating an operation of a storage system according to some example embodiments. FIG. 9 to FIG. 14 are diagrams illustrating the operation as shown in FIG. 8 according to some example embodiments. Further, it will be understood that the sequence of operations or steps is not limited to the order presented in the claims or figures unless specifically indicated otherwise. In some example embodiments, the order of operations or steps may be changed, several operations or steps may be merged, a certain operation or step may be divided, and a specific operation or step may not be performed.

Referring to FIG. 8, the host 101 transmits or sends a transfer command CMD to the CXL switch 120*a* in operation S100. Then, the CXL switch 120*a* transmits or sends this transfer command CMD to the CXL storage device 130 in operation S105.

Figure 9:
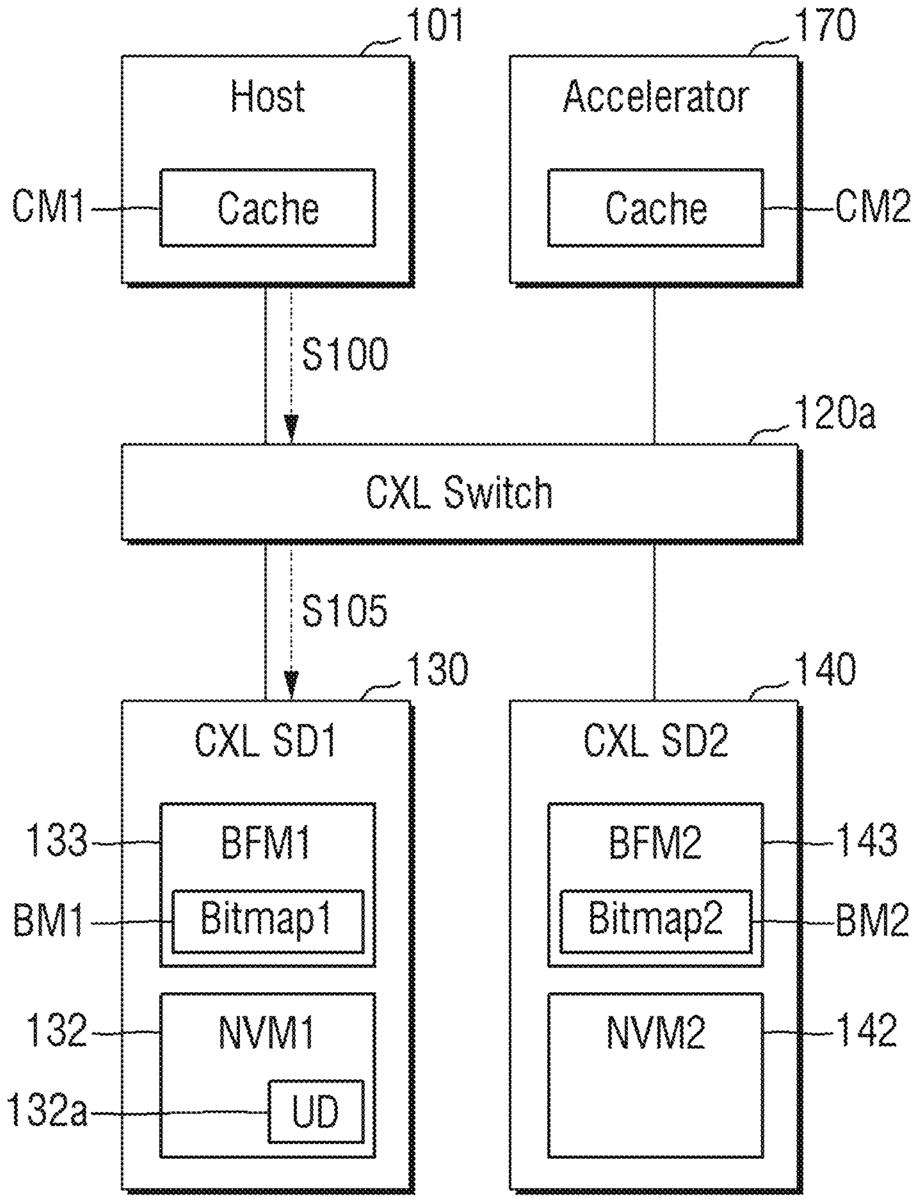
FIG. 9 to FIG. 14 are diagrams illustrating an operation shown in FIG. 8 according to some example embodiments.

Referring to FIG. 9, the transfer command transmitted or sent by the host 101 may be a command to instruct transferring or sending of the dirty data among the user data 132*a* stored in the non-volatile memory 132 of the CXL storage device 130 to the non-volatile memory 142 of the CXL storage device 140 in a device-to-device transmission/transfer manner.

In some example embodiments, in order to change a virtual machine, the host 101 may transmit or send a transfer command instructing transmission or transfer of the dirty data (e.g., updated data) to the CXL storage device 130. However, example embodiments of the present inventive concepts are not limited thereto.

In transferring the data between the devices (e.g., CXL storage devices 130 and 140), several factors may need to be, or are advantageous to be, considered.

First, for example, when the dirty data is transferred from the non-volatile memory 132 of the CXL storage device 130 to the non-volatile memory 142 of the CXL storage device 140, this transfer is a transfer between non-volatile memories, such that data transmissions or transfer speeds may be low or very low.

Moreover, in some example embodiments, since the computing system 100 is, or may be, continuously operating while (e.g., during, concurrently, etc.) the transfer command is issued and processed, data update may occur in the meantime, such that the user data 132*a* stored in the non-volatile memory 132 of the CXL storage device 130 may be data not having the latest status.

Accordingly, in some example embodiments, when the data is transferred between the devices (e.g., CXL storage devices 130 and 140) without considering the above factors, the data transmission or transfer speed may be low, and data inconsistency may occur. Therefore, according to some example embodiments, in order to increase the data transmission or transfer speed, the data transmission or transfer between devices is, or may be, performed in a manner in which the data is pre-fetched in the buffer memory 133 which has a higher data transmission or transfer speed than that of the non-volatile memory 132. In some example embodiments, in the process of transmitting, sending, or transferring the data between the devices (e.g., CXL storage devices 130 and 140), cache flush of the cache data stored in a cache CM2 of other devices (in this example, the accelerator 170 is taken by way of an example, but example embodiments of the present inventive concepts are not limited thereto) connected to the CXL switch 120*a* may be requested, such that data having the latest status may be transmitted, transferred, or sent between the devices.

Hereinafter, this operation will be described in more detail according to some example embodiments.

Referring again to FIG. 8, in some example embodiments, upon (e.g., in response to) receiving the transfer command, the CXL storage device 130 may generate the first thread Th1 and the second thread Th2 for the data transmission or transfer operation between the devices in operation S120. In some example embodiments, the storage controller 131 of the CXL storage device 130 may perform this operation. Moreover, in some example embodiments, the dirty data transfer manager 131*d* of the storage controller 131 of the CXL storage device 130 may perform this operation. Hereinafter, an example in which the storage controller 131 of the CXL storage device 130 controls the operation of the CXL storage device 130 is described according to some example embodiments.

The first thread Th1 performs the pre-fetch operation in operation S130. The second thread Th2 performs an operation requesting the cache flush in operation S140. The operation in which the second thread Th2 requests the cache flush may include an operation in which the CXL storage device 130 transmits or sends a request command REQ to request the cache flush to the CXL switch 120*a* in operation S142, an operation in which the CXL switch 120*a* transmits or sends the cache flush request REQ command to another device (e.g., caching devices 170) that is connected to the CXL switch 120*a* and performs a caching operation in operation S144, an operation in which the another device (e.g., caching devices 170) performing the caching operation transmits or sends cache data CDATA to the CXL switch 120*a* in operation S146, and an operation in which the CXL switch 120*a* transmits or sends the cache data CDATA to the CXL storage device 130 in operation S148.

Figure 10:
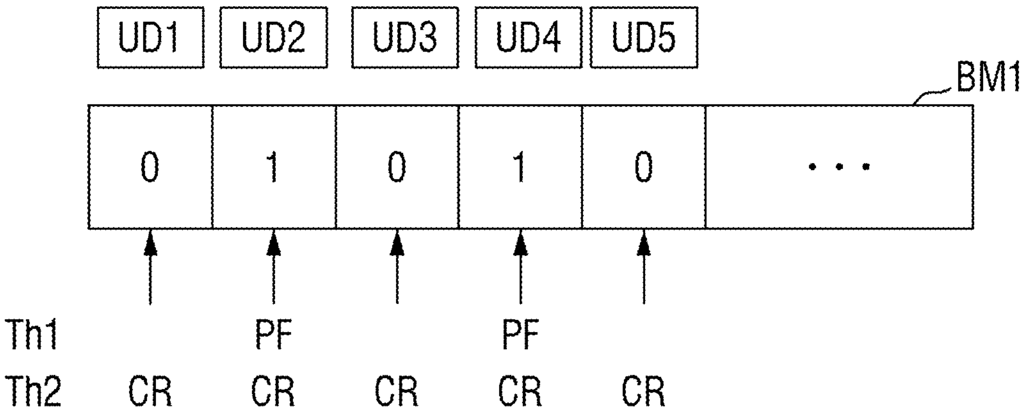

Referring to FIG. 10, according to some example embodiments, the operation performed by the first thread Th1 and the operation performed by the second thread Th2 may be performed in parallel or substantially parallel with each other. In some example embodiments, while the second thread Th2 performs an operation of transmitting or sending the request command REQ, the first thread Th1 may perform the pre-fetch operation as the background operation.

For example, the first thread Th1 may perform the pre-fetch operation PF of the user data corresponding to the bit value 1 which indicates that the user data is the dirty data, with reference to the bitmap BM1.

Figure 11:
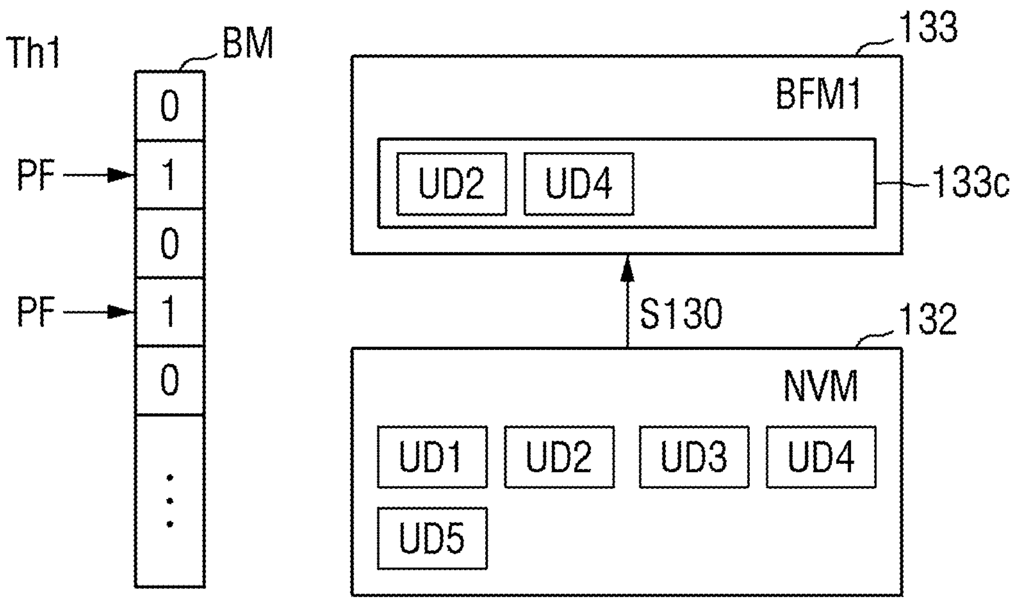

Referring to FIG. 11, according to some example embodiments, each of the user data UD2 and the user data UD4 among the user data UD1 to UD5 stored in the non-volatile memory 132 corresponds to the bit value 1. Thus, the first thread Th1 may perform the operation of pre-fetching the user data UD2 and the user data UD4 into the pre-fetch data area 133*c* of the buffer memory 133.

The second thread Th2 may perform an operation CR of transmitting, transferring, or sending a request command REQ on all user data regardless of the bit value of the bitmap BM1. The reason why the second thread Th2 may transmit or send the request command on all user data regardless of the bit value of the bitmap BM1 may be that even though the bitmap BM1 of the CXL storage device 130 indicates that a specific data is not the dirty data, the specific data may have been updated due to an event that may have occurred during the data transmission or transfer between devices.

Figure 12:
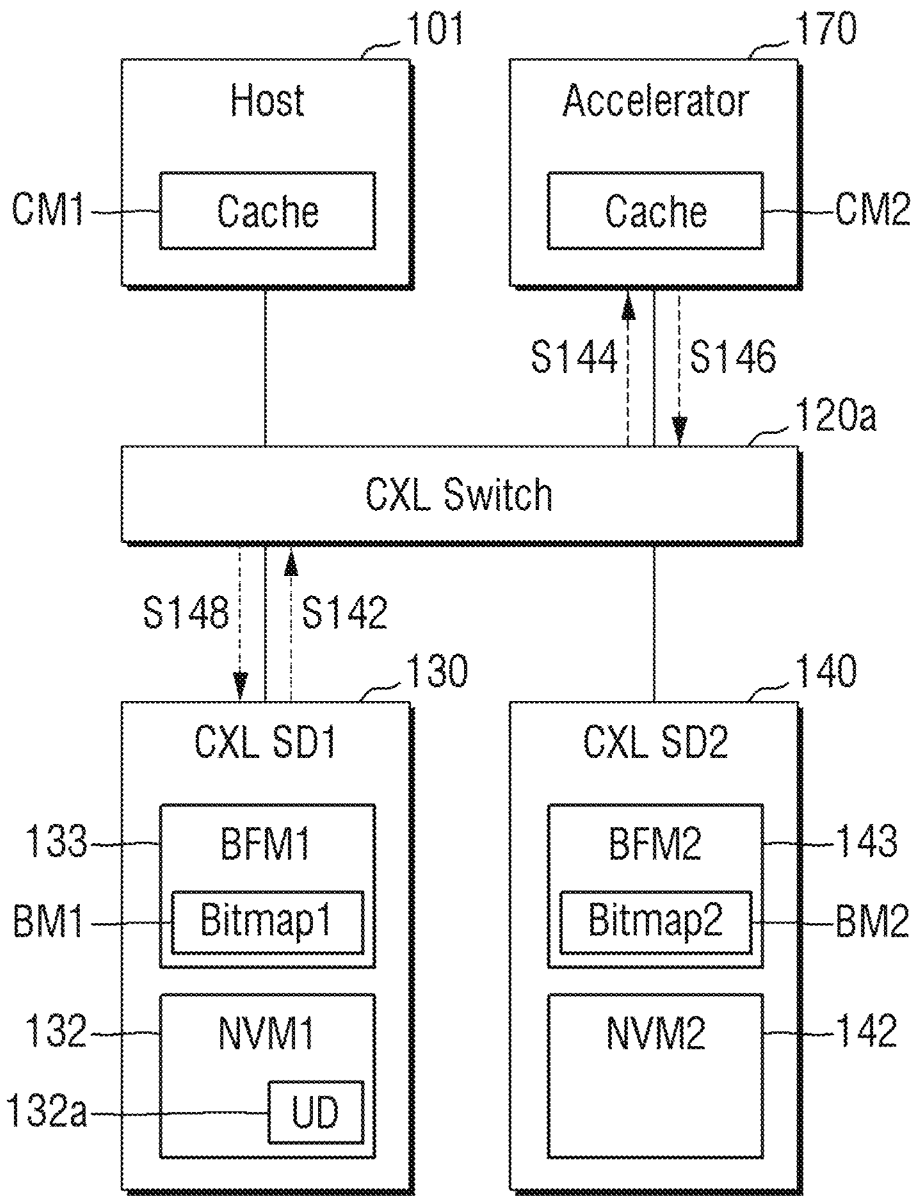

Therefore, according to some example embodiments, the second thread Th2 may transmit, transfer, or send, to the CXL switch 120*a*, a request command requesting cache flush of all user data regardless of the bit value of the bitmap BM1, as shown in FIG. 12 in operation S142. Then, for example, the CXL switch 120*a* may transmit, transfer, or send a request command requesting the cache flush to the accelerator 170 that is connected to the CXL switch 120*a* and may perform a caching operation in operation S144. The accelerator 170 may transmit, transfer, or send the cache data CDATA to the CXL switch 120*a* in operation S146, and then, the CXL switch 120*a* may transmit, transfer, or send the cache data CDATA to the CXL storage device 130 in operation S148.

In some example embodiments, each of the first thread Th1 and the second thread Th2 may perform the operation in consideration of a size of the pre-fetch data area 133*c*. The first thread Th1 performs the pre-fetch operation PF of the user data corresponding to the bit value 1 of the bitmap BM1 which indicates that the data is the dirty data. The second thread Th2 performs the operation CR of transmitting, transferring, or sending the request command on all user data regardless of the bit value of the bitmap BM1. Thus, according to some example embodiments, an amount of data pre-fetched in the pre-fetch data area 133*c* which has not yet received the corresponding cache data CDATA may gradually increase over time. In this regard, if the operation continues to be performed without considering the size of the pre-fetch data area 133*c*, overflow may occur in the pre-fetch data area 133*c*. Therefore, according to some example embodiments, each of the first thread Th1 and the second thread Th2 may adjust a timing at which the operation is performed in consideration of the size of the pre-fetch data area 133*c*.

Figure 14:
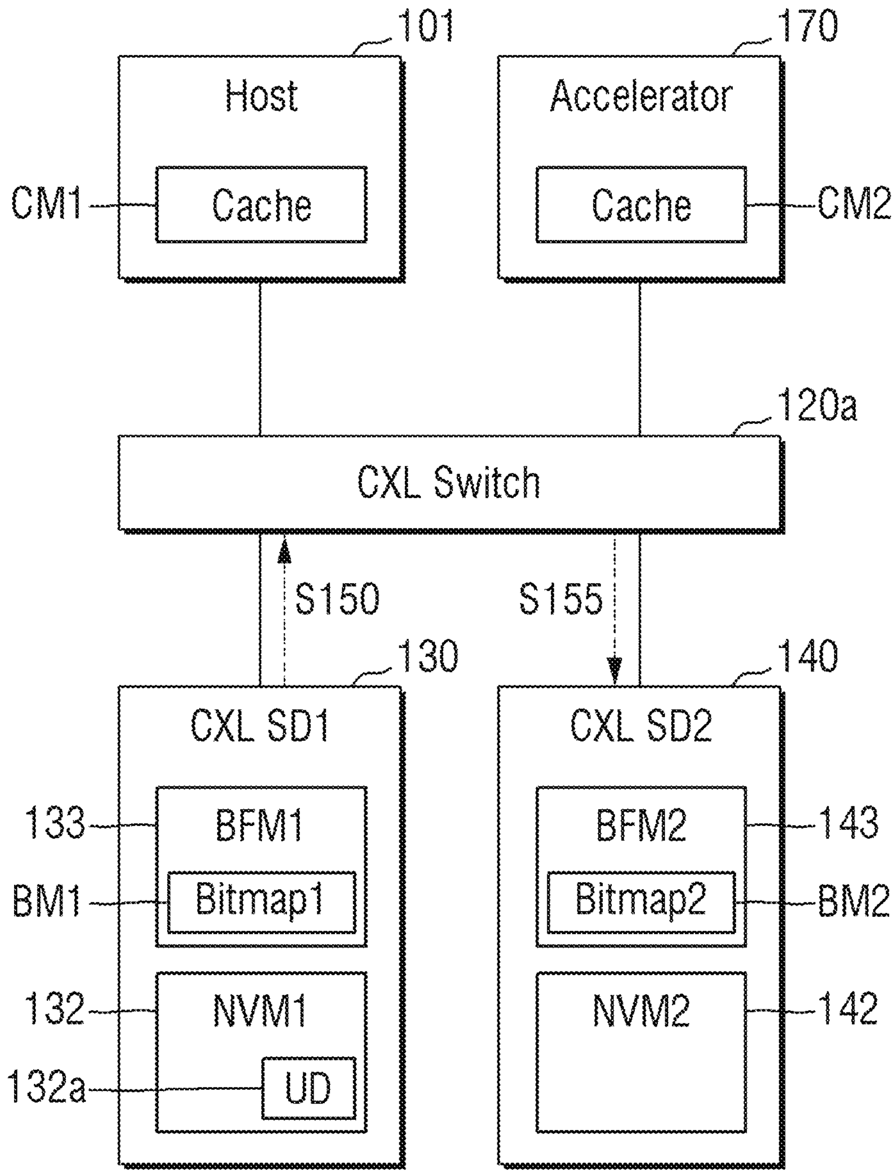

Referring to FIG. 8 and FIG. 14, in some example embodiments, the CXL storage device 130 transmits, transfers, or sends the data to the CXL switch 120*a* for data transmission or transfer between the devices in operation S150. Then, the CXL storage device 130 transmits, transfers, or sends the received data to the CXL storage device 140 to complete the data transfer between the devices in operation S155.

Figure 13:
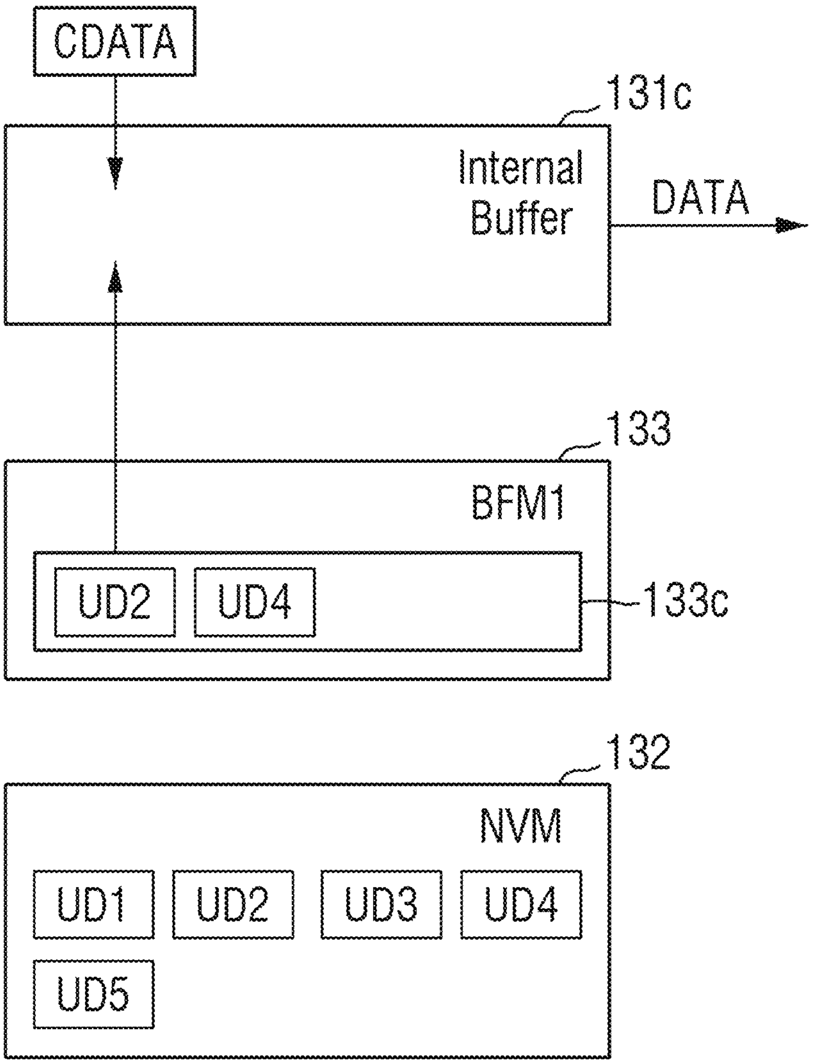

Referring to FIG. 13, according to some example embodiments, in transmitting, sending, or transferring the data between the devices, the second thread Th2 may check the received cache data CDATA on the user data corresponding to the bit value 0 of the bitmap BM1. Then, for example, when the latest data is present based the checking result, the second thread Th2 may store the latest data in the internal buffer 131*c*, and may transmit, transfer, or send a changed portion thereof to the CXL switch 120*a* for data transfer between the devices.

According to some example embodiments, the second thread Th2 may check the received cache data CDATA on the user data corresponding to the bit value 1 of the bitmap BM1. Then, for example, when the latest data is present based on the checking result, the second thread Th2 may apply the latest data to the data pre-fetched in the buffer memory 133 and transmit, transfer, or send the application result to the CXL switch 120*a*. In some example embodiments, when the latest data is absent based on the checking result, the second thread Th2 may transmit, transfer, or send the data pre-fetched in the buffer memory 133 to the CXL switch 120*a*.

Due to the configuration as described above, reliability and a speed of the storage device according to some example embodiments may be improved in transmitting the data between the devices.

Figure 15:
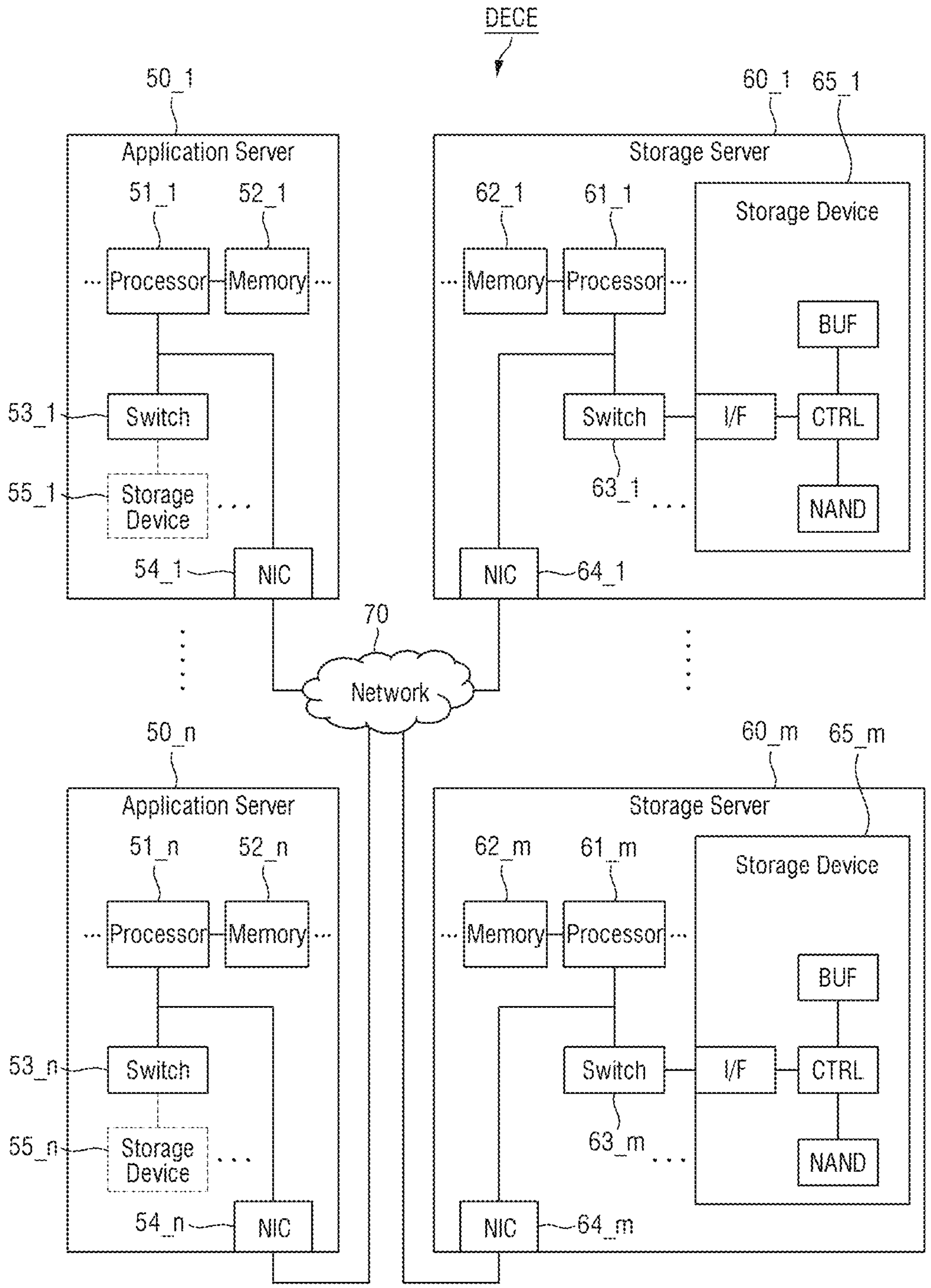
FIG. 15 is an example diagram illustrating a data center including a computing system according to some example embodiments.

FIG. 15 is an example diagram illustrating a data center to which the computing system according to some example embodiments is applied.

The above-described computing system may be included, as an application server and/or a storage server, in a data center DECE. According to some example embodiments, the storage system as described previously may be applied to each of the application server and/or the storage server.

The data center DECE may collect various data and provide services and may be referred to as a data storage center. For example, the data center DECE may be a system for operating a search engine and database or may be a computing system used by a company such as a bank or a government agency, but example embodiments are not limited thereto, and can be a system used by any number and types of companies.

As shown in FIG. 15, in some example embodiments, the data center DECE may include application servers 50_1 to 50_*n* and storage servers 60_1 to 60_*m* (each of m and n is an integer greater than 1). The number n of the application servers 50_1 to 50_*n* and the number m of the storage servers 60_1 to 60_*m* may be selected in various ways depending on various example embodiments. The number n of the application servers 50_1 to 50_*n* and the number m of the storage servers 60_1 to 60_*m* may be different from each other.

The application server 50_1 to 50_*n* may include at least one of a processor 51_1 to 51_*n*, a memory 52_1 to 52_*n*, a switch 53_1 to 53_*n*, an NIC (network interface controller) 54_1 to 54_*n*, and a storage device 55_1 to 55_*n*.

The processor 51_1 to 51_*n* may control overall operations of the application server 50_1 to 50_*n*, and may access the memory 52_1 to 52_*n* and execute instructions and/or data loaded in the memory 52_1 to 52_*n*. The memory 52_1 to 52_*n* may include, for example, DDR SDRAM (Double Data Rate Synchronous DRAM), HBM (High Bandwidth Memory), HMC (Hybrid Memory Cube), DIMM (Dual In-line Memory Module), Optane DIMM, or NVMDIMM (Non-Volatile DIMM), but example embodiments are not limited thereto.

In some example embodiments, the numbers of the processors and the memories included in the application server 50_1 to 50_*n* may be selected in various ways. In some example embodiments, the processor 51_1 to 51_*n* and the memory 52_1 to 52_*n* may provide a processor-memory pair. In some example embodiments, the number of the processors 51_1 to 51_*n* and the number of the memories 52_1 to 52_*n* may be different from each other. The processor 51_1 to 51_*n* may include a single core processor or a multi-core processor. In some example embodiments, as shown by a dotted line, the storage device 55_1 to 55_*n* may be omitted in the application server 50_1 to 50_*n*. The number of storage devices 55_1 to 55_*n* included in the storage server 50_1 to 50_*n* may be selected in various ways depending on various example embodiments.

The processor 51_1 to 51_*n*, the memory 52_1 to 52_*n*, the switch 53_1 to 53_*n*, the NIC 54_1 to 54_*n*, and/or the storage device 55_1 to 55_*n* may communicate with each other via the CXL interface and the CXL switch as described previously according to some example embodiments.

The storage server 60_1 to 60_*m* may include at least one of a processor 61_1 to 61_*m*, a memory 62_1 to 62_*m*, a switch 63_1 to 63_*m*, an NIC 64_1 to 64_*n*, and a storage device 65_1 to 65_*m*. The processor 61_1 to 61_*m* and the memory 62_1 to 62_*m* may respectively operate similarly to the processor 51_1 to 51_*n* and the memory 52_1 to 52_*n* of the application server 50_1 to 50_*n* as described above.

The application servers 50_1 to 50_*n* and the storage servers 60_1 to 60_*m* may communicate with each other via a network 70. In some example embodiments, the network 70 may be implemented using Fiber Channel (FC) or Ethernet. FC may be a medium used for relatively high-speed data transmission. An optical switch that provides high performance/high availability may be used as FC. Depending on an access scheme of the network 70, the storage server 60_1 to 60_*m* may be provided as file storage, block storage, or object storage.

In some example embodiments, the network 70 may be embodied as a storage dedicated network such as a SAN (Storage Area Network). For example, the SAN may be an FC-SAN that uses an FC network and is implemented according to a FCP FC Protocol. In some example embodiments, the SAN may be an IP-SAN that uses a TCP/IP network and is implemented according to an iSCSI (SCSI over TCP/IP or Internet SCSI) protocol. In some example embodiments, the network 70 may be a general network such as a TCP/IP network. For example, the network 70 may be implemented according to protocols such as FCOE (FC over Ethernet), NAS (Network Attached Storage), and NVMe-oF (NVMe over Fabrics).

Hereinafter, the application server 50_1 and the storage server 60_1 are mainly described by way of example. The description about the application server 50_1 may also be applied to other application servers (e.g., 50_*n*). The description about the storage server 60_1 may also be applied to other storage servers (e.g., 60_*m*).

The application server 50_1 may store data in one of the storage servers 60_1 to 60_*m* via the network 70 upon receiving a request from a user or a client to store the data. Further, the application server 50_1 may acquire data from one of the storage servers 60_1 to 60_*m* via the network 79 upon receiving a request from a user or a client to read the data. For example, the application server 50_1 may be implemented as a web server or DBMS (Database Management System).

The application server 50_1 may access the memory 52_*n* and/or the storage device 55_*n* included in another application server 50_*n* via the network 70, and/or may access the memories 62_1 to 62_*m* and/or the storage devices 65_1 to 65_*m* respectively included in the storage servers 60_1 to 60_*m* via the network 70. Accordingly, the application server 50_1 may perform various operations on data stored in the application servers 50_1 to 50_*n* and/or the storage servers 60_1 to 60_*m*. For example, the application server 50_1 may execute instructions for moving or copying data between the application servers 50_1 to 50_*n* and/or the storage servers 60_1 to 60_*m*. At this time, the data may be transferred from the storage devices 65_1 to 65_*m* of the storage servers 60_1 to 60_*m* to the memories 52_1 to 52_*n* of the application servers 50_1 to 50_*n* via the memories 62_1 to 62_*m* of the storage servers 60_1 to 60_*m* or may be transferred from the storage devices 65_1 to 65_*m* of the storage servers 60_1 to 60_*m* directly to the memories 52_1 to 52_*n* of the application servers 50_1 to 50_*n*. In some example embodiments, the data flowing over the network 70 may be encrypted data for security or privacy.

In the storage server 60_1, an interface IF may provide a physical connection between the processor 61_1 and a controller CTRL and a physical connection between the NIC 64_1 and the controller CTRL. For example, the interface IF may be implemented in a DAS (Direct Attached Storage) scheme in which the storage device 65_1 is directly connected to a dedicated cable. Further, for example, the interface IF may be implemented in various interface schemes such as ATA (Advanced Technology Attachment), SATA (Serial ATA), e-SATA (external SATA), SCSI (Small Computer Small Interface), SAS (Serial Attached SCSI), PCI (Peripheral Component Interconnection), PCIe (PCI express), NVMe (NVM express), IEEE 1394, USB (universal serial bus), SD (secure digital) card, MMC (multi-media card), eMMC (embedded multi-media card), UFS (Universal Flash Storage), eUFS (embedded Universal Flash Storage), and CF (compact flash) card interface, etc., but example embodiments are not limited thereto.

In the storage server 60_1, the switch 63_1 may selectively connect the processor 61_1 and the storage device 65_1 to each other, or may selectively connect the NIC 64_1 and the storage device 65_1 to each other, under control of the processor 61_1.

In some example embodiments, the NIC 64_1 may include a network interface card, a network adapter, etc. The NIC 54_1 may be connected to the network 70 via a wired interface, a wireless interface, a Bluetooth interface, an optical interface, etc. The NIC 54_1 may include an internal memory, DSP, a host bus interface, etc., and may be connected to the processor 61_1 and/or the switch 63_1, etc., via the host bus interface. In some example embodiments, the NIC 64_1 may be integrated with at least one of the processor 61_1, the switch 63_1, and the storage device 65_1.

In the application server 50_1 to 50_*n* or the storage server 60_1 to 60_*m*, the processor 51_1 to 51_*m* or 61_1 to 61_*n* may transmit, transfer, or send a command to the storage device 55_1 to 55_*n* or 65_1 to 65_*m* or the memory 52_1 to 52_*n* or 62_1 to 62_*m* to program or read data thereto or therefrom. In some example embodiments, the data may be data error-corrected via the ECC (Error Correction Code) engine. The data may be data subjected to DBI (Data Bus Inversion) or DM (Data Masking), and may include CRC (Cyclic Redundancy Code) information. The data may be encrypted data for security or privacy.

The storage device 55_1 to 55_*n* or 65_1 to 65_*m* may transmit, transfer, or send a control signal and a command/address signal to a non-volatile memory device (e.g., a NAND flash memory device) NVM in response to a read command received from the processor 51_1 to 51_*m* or 61_1 to 61_*n*. Accordingly, in some example embodiments, when the data is read-out from the non-volatile memory device NVM, a read enable signal may be input as a data output control signal to allow the data to be output to a DQ bus. A data strobe signal may be generated using the read enable signal. The command and the address signal may be latched according to a rising or falling edge of a write enable signal.

The controller CTRL may control all operations of the storage device 65_1. In some example embodiments, the controller CTRL may include SRAM (Static Random Access Memory). The controller CTRL may write data to the non-volatile memory device NVM in response to a write command. Alternatively, in some example embodiments, the controller CTRL may read data from the non-volatile memory device NVM in response to a read command. For example, the write command and/or the read command may be generated based on a request provided from the host, such as the processor 61_1 in the storage server 60_1, the processor 61_*m* in another storage server 60_*m*, or the processor 51_1 to 51_*n* in the application server 50_1 to 50_*n*. A buffer BUF may temporarily store (buffering) therein data to be written to the non-volatile memory device NVM or data read from the non-volatile memory device NVM. In some example embodiments, the buffer BUF may include DRAM. Moreover, the buffer BUF may store therein meta data. The meta data may refer to data generated by the controller CTRL to manage the user data or the non-volatile memory device NVM. The storage device 65_1 may include a secure element (SE) for security or privacy.

Although some example embodiments of the present inventive concepts have been described above with reference to the accompanying drawings, the present inventive concepts may not be limited to the described example embodiments and may be implemented in various different forms. Those of ordinary skill in the art and technical field to which the present inventive concepts belong will be able to understand that the present inventive concepts may be implemented in other specific forms without changing the technical ideas or features of the present inventive concepts. Therefore, it should be understood that the example embodiments as described above are illustrative in all respects and are not restrictive.

What is claimed is:

1. A storage device, comprising:

a first memory;

a second memory configured to store a bitmap indicating that data stored in the first memory includes dirty data; and a storage controller configured to control the first memory and the second memory, the storage controller configured to receive, from a CXL (Compute eXpress Link) switch, a transfer command to send the dirty data stored in the first memory to a first external device connected to the CXL switch; and in response to the transfer command, pre-fetch the dirty data stored in the first memory into the second memory, based on the bitmap; and send, to the CXL switch, a request command to request cache flush of the data stored in the first memory to at least one second external device connected to the CXL switch.

2. The storage device of claim 1, wherein the storage controller is configured to perform the pre-fetching as a background operation while the sending of the request command is performed.

3. The storage device of claim 2, wherein the storage controller is configured to:

in response to the transfer command, generate a first thread and a second thread, the first thread configured to perform the pre-fetching based on the bitmap, and the second thread configured to perform the sending of the request command regardless of the bitmap.

4. The storage device of claim 3, wherein the second memory includes:

an HDM (Host-managed Device Memory) area configured to store the bitmap; and a pre-fetch data area configured to store the dirty data pre-fetched from the first memory.

5. The storage device of claim 4, wherein the first thread and the second thread, respectively, are configured to perform the pre-fetching and the sending of the request command, based on a size of the pre-fetch data area.

6. The storage device of claim 2, wherein the first memory includes a non-volatile memory, and the second memory includes a volatile memory.

7. The storage device of claim 6, wherein the first memory includes a NAND flash memory, and the second memory includes a DRAM (Dynamic Random Access Memory).

8. The storage device of claim 1, wherein the storage controller is configured to:

when the bitmap indicates that the data stored in the first memory is not the dirty data, not perform the pre-fetching; or when the bitmap indicates that the data stored in the first memory is the dirty data, perform the pre-fetching.

9. The storage device of claim 8, wherein the sending of the request command is performed regardless of the bitmap.

10. The storage device of claim 1, wherein the storage controller is configured to:

check cache data flushed and received from the at least one second external device in response to the request command; and in response to the flushed cache data being latest data, send the latest data to the first external device based on the bitmap.

11. The storage device of claim 10, further comprising a third memory, and the storage controller is configured to:

when the bitmap indicates that the data stored in the first memory is not the dirty data, store the latest data in the third memory, and send the latest data stored in the third memory to the first external device; or when the bitmap indicates that the data stored in the first memory is the dirty data, store the data pre-fetched in the second memory into the third memory, update data stored in the third memory based on the latest data, and send the latest data stored in the third memory to the first external device.

12. The storage device of claim 11, wherein the first memory includes a NAND flash memory, the second memory includes a DRAM (Dynamic Random Access Memory), and the third memory includes a SRAM (Static Random Access Memory).

13. The storage device of claim 11, wherein the third memory is inside the storage controller.

14. The storage device of claim 1, wherein the first memory includes a first HDM (Host-managed Device Memory) area indicated by the bitmap, the second memory includes:

a second HDM area configured to store the bitmap; and a pre-fetch data area configured to store the data pre-fetched from the first memory.

15. A method for operating a storage device, the storage device including a first memory including a first HDM (Host-managed Device Memory) area;

a second memory, the second memory including a second HDM area configured to store a bitmap, the bitmap configured to store a plurality of bit values corresponding respectively to a plurality of data units of data stored in the first memory, wherein each bit value in the plurality of bit values is either a first bit value indicating a corresponding first data unit among the plurality of data units is dirty data, or a second bit value indicating a corresponding second data unit among the plurality of data units is not dirty data, and a pre-fetch data area configured to store data pre-fetched from the first memory; and a storage controller configured to control the first memory and the second memory, the method comprising:

receiving, by the storage controller, a transfer command from a CXL (Compute eXpress Link) switch, the transfer command configured to instruct sending one or more first data units corresponding to one or more first bit values of the bitmap among the data stored in the first memory to a first external device connected to the CXL switch;

in response to the transfer command, pre-fetching, by the storage controller, the one or more first data units corresponding to the one or more first bit values of the bitmap from the first memory to the second memory; and in response to the transfer command, sending, by the storage controller, a request command to the CXL switch, the request command configured to request cache flush of the one or more first data units corresponding to the one or more first bit values and one or more second data units corresponding to one or more second bit values of the bitmap to at least one second external device connected to the CXL switch.

16. The method for operating the storage device of claim 15, further comprising generating, by the storage controller, a first thread and a second thread in response to the transfer command, the first thread configured to perform the sending of the request command, and the second thread configured to perform the pre-fetching as a background operation while the first thread is configured to perform the sending of the request command.

17. The method for operating the storage device of claim 15, further comprising:

checking, by the storage controller, cache data flushed and received from the at least one second external device in response to the request command; and in response to the flushed cache data being latest data, sending, by the storage controller, the latest data to the first external device based on the bitmap.

18. The method for operating the storage device of claim 17, wherein the storage device further includes a third memory, and the method for operating the storage device further comprises:

in response to the bitmap including the one or more first bit values, storing, by the storage controller, the one or more first data units pre-fetched in the second memory into the third memory, updating, by the storage controller, data stored in the third memory based on the latest data, and sending, by the storage controller, the latest data stored in the third memory to the first external device; and in response to the bitmap including the one or more second bit values, storing, by the storage controller, the latest data in the third memory, and sending, by the storage controller, the latest data stored in the third memory to the first external device.

19. A storage system, comprising:

a host device;

a first CXL (Compute eXpress Link) device;

a second CXL device; and a CXL switch configured to connect the host device and the first and second CXL devices to each other via a CXL interface, the first CXL device including a first memory;

a second memory configured to store a bitmap indicating that data stored in the first memory includes dirty data; and a storage controller configured to control the first memory and the second memory, the storage controller configured to receive, from the CXL switch, a transfer command to send the dirty data indicated as the dirty data by the bitmap among the data stored in the first memory to the second CXL device; and in response to the transfer command, pre-fetch the dirty data stored in the first memory into the second memory based on the bitmap, and send, to the CXL switch, a request command requesting cache flush of the data stored in the first memory.

* * * * *